(12) United States Patent
Rösch et al.

(10) Patent No.: US 6,191,210 B1
(45) Date of Patent: *Feb. 20, 2001

(54) WATER-DILUTABLE BINDERS, AQUEOUS PAINTS CONTAINING THESE BINDERS, AND PROCESS FOR PRIMING OR PAINTING PLASTICS MATERIALS WITH A SINGLE COAT OF PAINT

(75) Inventors: Joachim Rösch, Ludwigshafen; Harald Borgholte; Horst Hintze-Brüning, both of Münster, all of (DE)

(73) Assignee: BASF Coatings AG, Muenster (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/043,559

(22) PCT Filed: Oct. 10, 1996

(86) PCT No.: PCT/EP96/04397

§ 371 Date: Jun. 23, 1998

§ 102(e) Date: Jun. 23, 1998

(87) PCT Pub. No.: WO97/14728

PCT Pub. Date: Apr. 24, 1997

(30) Foreign Application Priority Data

Oct. 13, 1995 (DE) .............................. 195 38 147

(51) Int. Cl.$^7$ ..................................... C08L 31/00
(52) U.S. Cl. .............................. 524/533; 525/301
(58) Field of Search .................. 525/193, 301; 524/533

(56) References Cited

U.S. PATENT DOCUMENTS 5,326,824 * 7/1994 Asanuma .............................. 525/288

FOREIGN PATENT DOCUMENTS

| 468 644 | 6/1991 | (EP) | C09D/201/02 |
| WO 95/28453 | 3/1995 | (EP) | C09D/151/06 |
| 01256 556 | 10/1989 | (JP) | C08L/51/00 |
| 4-255704 | 9/1992 | (JP) | C08F/255/00 |
| JP4-255704 | 9/1992 | (JP) | C08F/255/00 |
| 5-32737 | 2/1993 | (JP) | C08F/255/02 |

* cited by examiner

Primary Examiner—Paul R. Michl

(57) ABSTRACT

The invention relates to water-dilutable binders which can be prepared by subjecting
 (A) from 20 to 90% by weight of a mixture of
  (a1) from 3 to 50% by weight of acrylic acid, methacrylic acid or of a mixture of acrylic acid and methacrylic acid, and
  (a2) from 50 to 97% by weight of an ethylenically unsaturated monomer or of a mixture of ethylenically unsaturated monomers
to free-radical polymerization in the presence of
 (B) from 9.9 to 79.9% by weight of a halogen-free copolymer composed of
  (b1) from 1 to 99, preferably from 50 to 90% by weight, of propylene,
  (b2) from 1 to 99, preferably from 10 to 50% by weight, of at least one olefin which is copolymerizable with (b1) and contains per molecule from five to twenty, preferably from six to eight, carbon atoms, with the exception of isoprene, and
  (b3) from 0 to 50, preferably from 0 to 25% by weight, of ethylene and/or butylene,
or of a mixture of such copolymers, and
 (C) from 0.1 to 10% by weight of a free-radical initiator or of a mixture of free-radical initiators,
and, after neutralization of at least 20% of the carboxyl groups which are present in the resulting polymerization product, dispersing the polymerization product in water, the sum of the percentages by weight of components (A), (B) and (C) and of (a1) and (a2) being in each case always 100% by weight, and the composition of the mixture of (al) and (a2) being selected such that polymerization of the mixture of (al) and (a2) alone gives a polymer which has a glass transition temperature of from 0 to 150° C., and contains from 0.04 to 1.0 milliequivalent of one or more of the following functional groups: —COOH, —OH, —NR3, —CN, —CONH2, —CO—, —NHCONH—, —OCONH—, —OP3H, —OSO3H, —R—O—R—, where R is an organic radical.

10 Claims, No Drawings

WATER-DILUTABLE BINDERS, AQUEOUS PAINTS CONTAINING THESE BINDERS, AND PROCESS FOR PRIMING OR PAINTING PLASTICS MATERIALS WITH A SINGLE COAT OF PAINT

BACKGROUND OF THE INVENTION

The invention relates to water-dilutable binders, to aqueous coating materials containing these binders and to processes for the priming or one-coat painting of plastics.

In order when painting plastics to achieve satisfactory adhesion of the applied coat or the applied coats it is necessary to pretreat the plastic surface, for example by flame treatment, corona treatment, plasma treatment or by etching with chromosulfuric acid and/or priming with special coating materials.

Pretreatment methods such as flame treatment, corona treatment, plasma treatment or etching with chromosulfuric acid are associated with technical effort and/or should be avoided on ecological grounds.

To prime plastics based on polypropylene, it is usual to employ coating materials which have the disadvantage that they include halogen-containing binders (cf. for example JP-A-256 556/1989).

EP-A-468 644 describes coating materials which are said to be also suitable for the priming of plastics. The preparation of the binders employed in these coating materials, however, requires monomers which can be obtained only with difficulty.

The technical object of the present invention is to provide water-dilutable binders and aqueous coating materials which contain these binders and which can be employed in processes for the priming or one-coat painting of plastics.

SUMMARY OF THE INVENTION

This object is surprisingly achieved by the provision of water-dilutable binders which are characterized in that they can be prepared by subjecting (A) from 20 to 90% by weight, preferably from 55 to 85% by weight, of a mixture of
 (a1) from 3 to 50% by weight, preferably from 5 to 15% by weight, of acrylic acid, methacrylic acid or a mixture of acrylic acid and methacrylic acid, and
 (a2) from 50 to 97% by weight, preferably from 85 to 95% by weight, of an ethylenically unsaturated monomer which is different from (a1) or of a mixture of such ethylenically unsaturated monomers to free-radical polymerization in the presence of (B) from 9.9 to 79.9% by weight, preferably from 15 to 45% by weight, of a halogen-free copolymer composed of
 (b1) from 1 to 99, preferably from 50 to 90% by weight, of propylene,
 (b2) from 1 to 99, preferably from 10 to 50% by weight, of at least one olefin which is copolymerizable with (b1) and contains per molecule from five to twenty, preferably from six to eight, carbon atoms, with the exception of isoprene, and
 (b3) from 0 to 50, preferably from 0 to 25%. by weight, of ethylene and/or butylene,
or of a mixture of such copolymers, and (C) from 0.1 to 10% by weight, preferably from 1 to 7% by weight, of a free-radical initiator or of a mixture of free-radical initiators, and, after neutralization of at least 20% of the carboxyl groups which are present in the resulting polymerization product, dispersing the polymerization product in water, the sum of the percentages by weight of components (A), (B) and (C) and of (a1) and (a2) and (b1), (b2) and (b3) being in each case always 100% by weight, and the composition of the mixture of (a1) and (a2) being selected such that polymerization of the mixture of (a1) and (a2) alone gives a polymer which has a glass transition temperature of from 0 to 150° C., preferably from 10 to 80° C., contains from 0.04 to 1.0, preferably from 0.1 to 0.5 milliequivalent of one or more of the following functional groups: —COOH, —OH $NR_3$, —CN, $CONH_2$, —CO—, —NHCONH—, —OCONH—, —$OPO_3H$, —$OSO_3H$, —R—O—R—, preferably —COOH, —CN, —$CNH_2$ and —R—O—R, where R is an organic radical, preferably an alkyl or alkylene radical having 1 to 6 carbon atoms, and which comprises from 0 to 50, preferably from 5 to 25% by weight of one or more of the following cycloaliphatic groups which can be substituted by at least one alkyl group which contains 1 to 12, preferably 1 to 6 carbon atoms: cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl and bicyclododecyl group, preferably cyclohexyl and isobornyl group.

DETAILED DESCRIPTION OF THE PREFERRED EMBODIMENT

Aqueous coating materials containing these binders can be employed in processes for the priming or one-coat painting of plastics, especially plastics based on polypropylene and/or copolymers of propylene and copolymerizable monomers, for example ethylene, and are notable for the fact that they give coating films which adhere very well to pretreated and nonpretreated plastics substrates.

The mixture (A) employed to prepare the novel water-dilutable binders consists of (a1) from 3 to 50% by weight, preferably from 5 to 15% by weight, of acrylic acid, methacrylic acid or of a mixture of acrylic acid and methacrylic acid, and (a2) from 50 to 97% by weight, preferably from 85 to 95% by weight, of an ethylenically unsaturated monomer or of a mixture of ethylenically unsaturated monomers, the sum of the percentages by weight of components (a1) and (a2) being always 100% by weight, and the composition of the mixture of (a1) and (a2) being selected such that polymerization of the mixture of (a1) and (a2) alone gives a polymer which has a glass transition temperature of from 0 to 150, preferably from 10 to 80° C., contains from 0.04 to 1.0, preferably from 0.1 to 0.5 milliequivalent of one or more of the following functional groups: —COOH, —OH, $NR_3$, $CONH_2$, —CO—, —NHCONH—, —OCONH—, $OPO_3H$, $OSO_3H$, —R—O—R—, preferably —COOH, —CN, —$CHH_2$ and —R—O—R—, where R is an organic radical, preferably an alkyl or alkylene radical having 1 to 6 carbon atoms, and which comprises from 0 to 50, preferably from 5 to 25% by weight of one or more of the following cycloaliphatic groups which can be substituted by at least one alkyl group which contains 1 to 12, preferably 1 to 6 carbon atoms: cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl and bicyclododecyl group, preferably cyclohexyl and isobornyl group.

Since the glass transition temperatures of polymers prepared from ethylenically unsaturated monomers can be calculated in accordance with the equation $$1/Tg \times \Sigma W_n/Tg_n$$

Tg=Glass transition temperature of the copolymer in ° K
$W_n$=Proportion by weight of the nth monomer
Tgn=Glass transition temperature of the homopolymer of the nth monomer, and since ethylenically unsaturated monomers which contain —COOH, —OH, NR$_3$, —CN, CONH$_2$, —CO—, —NHCONH—, —OCONH—, OPO$_3$H, OSO$_3$H, —R—O—R—(where R is an organic radical, preferably an alkyl or alkylene radical having 1 to 6 carbon atoms), cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl or bicyclododecyl groups are available commercially, the person skilled in the art is able without difficulty to select the composition of the mixture of components (a1) and (a2) such that a polymer resulting from the polymerization of the mixture of (a1) and (a2) alone has a glass transition temperature of from 0 to 150° C., preferably from 10 to 80° C., contains from 0.04 to 1.0, preferably from 0.1 to 0.5 milliequivalent of one or more of the following functional groups: —COOH, —OH—, NR$_3$, —CN, CONH$_2$, —CO—, —NHCONH—, —OCONH—, OPO$_3$H, OSO$_3$H, —R—O—R—preferably —COOH, —CN, —CNH$_2$ and —R—O—R—, where R is an organic radical, preferably an alkyl or alkylene radical having 1 to 6 carbon atoms, and which comprises from 0 to 50, preferably from 5 to 25% by weight of one or more of the following cycloaliphatic groups which can be substituted by at least one alkyl group which contains 1 to 12, preferably 1 to 6 carbon atoms: cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl and bicyclododecyl group, preferably cyclohexyl and isobornyl group.

Taking into account the selection criteria described above, possible examples for use as component (a2) are: esters of acrylic acid or methacrylic acid, especially aliphatic and cycloaliphatic acrylates or methacrylates having up to 20 carbon atoms in the alcohol radical, for example methyl, ethyl, propyl, butyl, hexyl, ethylhexyl, stearyl, lauryl, isobornyl, cyclohexyl and tert-butylcyclohexyl acrylate or methacrylate, hydroxyalkyl esters of acrylic acid, methacrylic acid or of another α,β-ethylenically unsaturated carboxylic acid, for example 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate or 4-hydroxybutyl methacrylate, corresponding esters of other ethylenically unsaturated acids having up to 6 carbon atoms in the molecule, for example ethacrylic acid and crotonic acid, acrylamidomethylpropanesulfonic acid, vinyl-aromatic hydrocarbons, for example styrene, α-alkylstyrene and vinyltoluene, monomers containing amide groups, for example acrylamide, methacrylamide, N-methylolacrylamide and N-methylolmethacrylamide, and monomers containing nitrile groups, for example acrylonitrile and methacrylonitrile, or mixtures of the monomers mentioned.

As component (B) a halogen-free copolymer is employed composed of (b1) from 1 to 99, preferably from 50 to 90% by weight, of propylene, (b2) from 1 to 99, preferably from 10 to 50% by weight, of at least one olefin which is copolymerizable with (b1) and contains per molecule from five to twenty, preferably from six to eight, carbon atoms, with the exception of isoprene, and (b3) to 50, preferably from 0 to 25% by weight, of ethylene and/or butylene, or of a mixture of such copolymers.

The copolymers employed in accordance with the invention as component (B) have a weight-average molecular weight of from 1000 to 100,000, preferably 3000 to 50,000 (determined by gel permeation chromatography using a polypropylene standard) and an iodine number of up to 0.3, preferably from 0.005 to 0.05 mg of I$_2$/g, and they can have been subjected to a graft reaction with maleic anhydride.

As component (b2) use is made of at least one olefin which is copolymerizable with (b1) and contains per molecule from five to twenty, preferably from six to eight, carbon atoms, with the exception of isoprene. The olefin employed as component (b2) may be unbranched, branched, acyclic or cyclic. Examples of acyclic olefins are pentene, hexene, heptene, octene, nonene and decene. Examples of cyclic olefins are cyclopentene, cyclohexene, cycloheptene, cyclooctene, cyclonone, cyclodecene and norbornene. As component (b2) it is preferred to employ preferably branched or unbranched acylic olefins containing, per molecule, from five to twenty, preferably from six to eight, carbon atoms and only one, preferably α-positioned, olefinically unsaturated double bond. Examples of such olefins are 1-pentene, 1-hexene, 1-heptene, 1-octene, 1-nonene and 1-decene. As component (b2) it is particularly preferred to employ 1-hexene, 1-heptene and 1-actene.

In order to prepare the novel water-dilutable binders from 20 to 90% by weight, preferably from 55 to 85% by weight, of the mixture (A) is subjected to free-radical polymerization in the presence of from 9.9 to 79.9% by weight, preferably from 15 to 45% by weight, of component (B) and from 0.1 to 10% by weight, preferably from 1 to 7% by weight, of component (C), and, after neutralization of at least 20% of the carboxyl groups which are present in the resulting polymerization product, the polymerization product is dispersed in water. The sum of the percentages by weight of components (A), (B) and (C) is always 100% by weight.

The polymerization of the mixture (A) in the presence of components (B) and (C) can be carried out in bulk, in aqueous emulsion or in an organic solvent or a mixture of organic solvents. The polymerization is preferably carried out in an organic solvent or a mixture of organic solvents, especially in apolar solvents having a boiling range of between 120 to 200, preferably from 135 to 190° C., at polymerization temperatures of from 120 to 200° C., preferably from 130 to 160° C.

As component (C) it is possible in principle to employ all known free-radical initiators. Those preferably employed are free-radical initiators which at the polymerization temperature have a half-life of between 15 and 180 minutes. Examples of free-radical initiators which can be employed are: dialkyl peroxides, for example dicumyl peroxide and di-tertbutyl peroxide, peroxyesters, for example tert-butyl peroxybenzoate, tert-butyl peroxyoctanoate, tert-butyl peroxyacetate and tert-butyl peroxyisobutyrate, diacyl peroxides, for example benzoyl peroxide and acetyl peroxide, and azo compounds, for example azo-bis (isobutyronitrile). As component (C) it is particularly preferred to employ di-tert-butyl peroxide, tert-butyl perethylhexanoate and tert-butyl peracetate.

To neutralize the polymerization product it is preferred to employ organic amines, especially tertiary amines such as, for example, dimethylethanolamine.

Using the novel binders it is possible, by methods which are well known to the person skilled in the art, to prepare aqueous coating materials which can be employed for the priming or one-coat painting of plastics, especially plastics based on polypropylene and/or copolymers of propylene and copolymerizable monomers such as ethylene, for example, and which can be used to prepare coating films which adhere very well to pretreated and nonpretreated plastics substrates. The novel binders can also be employed in basecoats for the production of multicoat finishes of the "basecoat-clearcoat" type.

The aqueous coating materials prepared using the novel binders may also contain, in addition to the novel binders, other compatible synthetic resins, for example polyacrylate resins, polyester resins and polyurethane resins (cf. for example DE-A-42 39 695) and crosslinking agents such as, for example, aminoplastic resins and/or optionally blocked polyisocyanates. If nonblocked polyisocyanates are employed, it is generally expedient to store the aqueous coating materials as a two-component system.

The aqueous coating materials prepared using the novel binders can be formulated either with or without pigments and/or fillers. They can also be applied in very thin coat thicknesses (from 5 to 10 $\mu$m).

The aqueous coating materials prepared using the novel binders generally contain, in their ready-to-apply state, from 30 to 80, preferably from 45 to 70% by weight of water, from 0 to 50, preferably from 0 to 10% by weight of organic solvents, from 6 to 70, preferably from 15 to 45% by weight of the novel binder, from 0 to 40, preferably from 0 to 25% by weight of pigments and/or fillers and from 0 to 10% by weight of other additives, for example catalysts, thickeners, leveling agents, etc., the percentages by weight being based on the overall formulation of the coating material in the ready-to-apply state (i.e. at spray viscosity, for example).

With the aqueous coating materials prepared using the novel binders it is possible to prime, or to paint in a single coat, plastics such as, for example, ABS, AMMA, ASA, CA, CAB, EP, UF, CF, MF, MPF, PF, PAN, PA, PC, PE, HDPE, LDPE, PETP, PMMA, PP, PS, SB, PUR, PVC, RF, SAN, PP-EPDM and UP (abbreviations according to DIN 7728T1), preferably polyolefins such as polypropylene and polypropylene-EPDM. The plastics to be painted may of course also be polymer blends, modified plastics or fiber-reinforced plastics. The plastics primed with the aqueous coating materials according to this invention may be overpainted using, for example, one-coat solid-color or metallic systems or two-coat solid-color or metallic systems of the basecoat-clearcoat type, without problems.

In the text below the invention is illustrated in more detail with reference to working examples. In these examples all parts are by weight unless expressly stated otherwise.

1. PREPARATION OF AN AQUEOUS DISPERSION OF A NOVEL BINDER 300.0 parts of a mixture of aromatic solvents having a boiling range of from 165° C. to 185° C. (SHELLSOL® A) and 150.0 parts of a random copolymer of propylene and hexylene (1-hexene) having a weight-average molecular weight of 10,000 g/mol are weighed into a stainless-steel polymerization vessel with stirrer, reflux condenser, a monomer feed and an initiator feed, and are heated to 115° C. The mixture is stirred at this temperature for 1 hour. Then a mixture of 36.0 parts of tert-butyl perethylhexanoate and 46.5 parts of SHELLSOL® A is added dropwise to the homogeneous mixture at a constant rate over the course of 5 hours, the temperature in the reaction mixture being held at 115° C. 30 minutes after the beginning of the addition of the tert-butyl perethylhexanoate solution, a mixture of 160.8 parts of butyl methacrylate, 162 parts of methyl methacrylate, 168 parts of cyclohexyl methacrylate and 91.8 parts of methacrylic acid are added over the course of 4 hours. After the end of the initiator feed, polymerization is continued for 2 hours more. Then enough solvent is distilled off to give a resin solution having a content of nonvolatile constituents of 95% by weight. This solution is subsequently diluted with butyl acetate 98/100 to a content of nonvolatile constituents of 50% by weight, and is cooled to 110° C. Subsequently, 44.9 parts of dimethylethanolamine are added to this solution and the mixture is stirred for 30 minutes. Then 1834.0 parts of deionized water are added with stirring at 80° C. Finally, the organic solvents are removed by distillation from the aqueous dispersion thus obtained until a residual solvent content of less than 5% by weight has been reached. The aqueous dispersion obtained in this way has a content of nonvolatile components of 30% by weight (1 h/130° C.), an acid number of 40 and a pH of 8.2.

2. USE OF THE AQUEOUS DISPERSION PREPARED ACCORDING TO 1. FOR PRIMING SUBSTRATES OF PP/EPDM

The aqueous binder dispersion prepared according to 1. is diluted with deionized water to a viscosity of 25 sec (DIN4 cup) and is applied at 23° C. and 60% relative atmospheric humidity, using a spray pressure of 4–5 bar, to a PP/EPDM test panel (KELTAN TP 0550, DSM) which has been wiped beforehand with a paper towel impregnated with isopropanol, so as to give a dry film thickness of 5 $\mu$m. The film is flashed off at 23° C. for 10 minutes. A solvent-containing metallic basecoat is then applied under the abovementioned conditions with a dry film thickness of 15 $\mu$m. After a flash-off time of 5 minutes at 23° C., a solvent-containing two-component clearcoat is applied under the abovementioned conditions with a dry film thickness of 40 $\mu$m. After a flash-off time lasting 15 minutes at 23° C., the entire coating system is baked at an oven temperature of 120° C. for 45 minutes. The coating system prepared in this way adheres very well to the substrate.

What is claimed is:
1. An aqueous coating material, comprising at least one water-dilutable binder resulting from the free-radical polymerization of:
(A) from 20 to 90% by weight of a mixture of monomers, comprising:
(a1) from 3 to 50% by weight of a first monomer selected from the group consisting of acrylic acid, methacrylic acid and mixtures thereof, and
(a2) from 50 to 97% by weight of an ethylenically unsaturated second monomer which is different from said first monomer (a1) or a mixture of such ethylenically unsaturated monomers,
wherein the composition of said mixture of monomers (a1) and (a2) is selected such that polymerization of said mixture of monomers (a1) and (a2) alone gives a polymer which
has a glass transition temperature of from 0 to 150 degrees C.,
contains from 0.04 to 1.0 milliequivalents of one or more of the following functional groups: —COOH, —OH, —NR$_3$, —CN, —CONH$_2$, —CO—, —NHCONH—, —OCONH—, —OPO$_3$H, —OSO$_3$H, —R—OR—R—, (where R is an organic radical), and
comprises from 0 to 50% by weight of one or more cycloaliphatic groups substituted by at least one alkyl group having 1 to 12 carbon atoms and selected from the group consisting of cyclopentyl, cyclohexyl, perhydronapthyl, perhydroanthracyl, perhydrophenanthryl, adamantyl, isobornyl, bicyclohexyl, bicycloheptyl, bicyclooctyl, bicyclononyl, bicyclodecyl, bicycloundecyl, biciclododecyl groups and mixtures thereof;

in the presence of
(B) from 9.9 to 79.9% by weight of a halogen-free copolymer composed of:
(b1) from 1 to 99% of propylene;
(b2) from 1 to 99% by weight of at least one olefin which is copolymerizable with (b1) and which contains per molecule from five to twenty carbon atoms, with the exception of isoprene, and
(b3) from 0 to 50% by weight, of a member of the group consisting of ethylene butylene, and mixtures thereof,
or of a mixture of such copolymers, and
(C) from 0.1 to 10% by weight of a free-radical initiator or a mixture of free-radical initiators,
and, after neutralization of at least 20% of the carboxyl groups which are present in the resulting polymerization product,
dispersing the polymerization product in water,
wherein the sum of the percentages by weight of components (A), (B), and (C) and of (a1) and (a2) and (b1), (b2) and (b3) is, in each case, always 100% by weight.

2. A process for priming or one-coat painting a plastic substrate, comprising providing a plastic substrate, and applying the aqueous coating material of claim 8 to the plastic substrate.

3. The process of claim 2, wherein the plastic substrate comprises polypropylene.

4. An aqueous coating composition, comprising
from 30 to 80 percent by weight of water,
from 6 to 70 percent by weight of a water-dilutable binder, the percentages by weight being based on the overall formulation of the aqueous coating composition and said binder comprising
the reaction product of the free-radical polymerization of:
(A) from 20 to 90% by weight of a mixture of
(a1) from 3 to 50% by weight of a monomer selected from the group consisting of acrylic acid, methacrylic acid and mixtures thereof, and
(a2) from 50 to 97% by weight of an ethylenically unsaturated monomer which is different from (a1) or a mixture of such ethylenically unsaturated monomers, in the presence of
(B) from 9.9 to 79.9% by weight of a halogen-free copolymer composed of
(b1) from 1 to 99% of propylene,
(b2) from 1 to 99% by weight of at least one olefin which is copolymerizable with (b1) and contains per molecule from five to twenty, preferably from six to eight, carbon atoms, with the exception of isoprene, and
(b3) from 0 to 50% by weight, of a member of the group consisting of ethylene, butylene, and mixtures thereof,
or of a mixture of such copolymers, and
(C) from 0.1 to 10% by weight of a free-radical initiator or of a mixture of free-radical initiators,
wherein
at least 20% of the carboxyl groups which are present in the resulting polymerization product are neutralized and the polymerization product is dispersed in water to provide a substantially homogenous mixture,
the sum of the percentages by weight of components (A), (B) and (C) and of (a1) and (a2) and (b1), (b2) and (b3) are based on the total weight of the aqueous composition, and
the composition of the mixture of (a1) and (a2) is selected such that polymerization of the mixture of (a1) and (a2) alone gives a polymer which
has a glass transition temperature of from 0 to 150° C.,
contains from 0.04 to 1.0 milliequivalent of one or more of the following functional groups: —COOH, —OH, —NR$_3$, —CN, —CONH$_2$, —CO—, —NHCONH—, —OCONH—, OPO$_3$H, —OSO$_3$H, —R—O—R—, (where R is an organic radical), and
comprises from 0 to 50% by weight of one or more cycloaliphatic groups substituted by at least one alkyl group having 1 to 12 carbon atoms and selected from the group consisting of cyclopentyl, cyclohexyl, perhydronaphtyl, perhydroanthracyl, perhydrophenanthryl, adamantyl, isobornyl, bicyclohexyl, bicycloheptyl, bicyclooctyl, bicyclononyl, bicyclodecyl, bicycloundecyl, bicyclododecyl groups and mixtures thereof, and
the water and the water-dilutable binder being mixed so as to provide a substantially homogenous and stable mixture.

5. The aqueous coating material of claim 1, wherein component (A) is employed in a quantity of from 55 to 85% by weight.

6. The aqueous coating material of claim 1, wherein component (a1) is employed in a quantity of from 5 to 15% by weight.

7. The aqueous coating material of claim 1, wherein component (a2) is employed in a quantity of from 85 to 95% by weight.

8. The aqueous coating material of claim 1, wherein component (B) is employed in an amount of from 15 to 45% by weight.

9. The aqueous coating material of claim 1, wherein from 1 to 7% by weight of component (C) is employed.

10. The aqueous coating material of claim 1, wherein polymerization of the mixture of (a1) and (a2) alone gives a polymer comprising a glass transition temperature of from 10 to 80° C., from 0.1 to 1.5 milliequivalent of one or more of the following functional groups: —COOH, —CH, —CNH$_2$, and —R—O—R—, and from 5 to 25% by weight of cyclohexyl groups or isobornyl groups or of a mixture of these groups.

* * * * *